(12) United States Patent
Tomori

(10) Patent No.: US 10,922,899 B2
(45) Date of Patent: Feb. 16, 2021

(54) METHOD OF INTERACTIVE QUANTIFICATION OF DIGITIZED 3D OBJECTS USING AN EYE TRACKING CAMERA

(71) Applicant: ÚSTAV EXPERIMENTÁLNEJ FYZIKY SAV, Košice (SK)

(72) Inventor: Zoltan Tomori, Košice (SK)

(73) Assignee: ÚSTAV EXPERIMENTÁLNEJ FYZIKY SAV, Kosice (SK)

( * ) Notice: Subject to any disclaimer, the term of this patent is extended or adjusted under 35 U.S.C. 154(b) by 0 days.

(21) Appl. No.: 16/340,952

(22) PCT Filed: Oct. 13, 2017

(86) PCT No.: PCT/SK2017/000009
§ 371 (c)(1),
(2) Date: Apr. 10, 2019

(87) PCT Pub. No.: WO2018/074982
PCT Pub. Date: Apr. 26, 2018

(65) Prior Publication Data
US 2019/0236851 A1    Aug. 1, 2019

(30) Foreign Application Priority Data
Oct. 17, 2016 (SK) .................................. 50070-2016

(51) Int. Cl.
*G06T 19/20* (2011.01)
*G06F 3/01* (2006.01)
(Continued)

(52) U.S. Cl.
CPC .............. *G06T 19/20* (2013.01); *G06F 3/013* (2013.01); *G06F 3/017* (2013.01);
(Continued)

(58) Field of Classification Search
CPC ...... G06F 3/013; G06F 3/017; G06F 3/04842; G06K 9/00335; G06K 9/00127;
(Continued)

(56) References Cited

U.S. PATENT DOCUMENTS

2006/0112334 A1   5/2006  Endrikhovski
2010/0182232 A1   7/2010  Zamoyski
(Continued)

FOREIGN PATENT DOCUMENTS

| JP | 2005322257 A | 11/2005 |
| WO | 2007107949 A1 | 9/2007 |
| WO | 2016063167 A1 | 4/2016 |

OTHER PUBLICATIONS

International Search Report for PCT/SK2017/000009 dated Jan. 24, 2018.
(Continued)

*Primary Examiner* — Haixia Du
(74) *Attorney, Agent, or Firm* — Millman IP Inc.

(57) ABSTRACT

A method of interactive quantification of digitized 3D objects includes a determination of coordinates of observed screen space using a camera that senses the position of pupils of the operator gazing on the screen. Dimensions of studied sub-volume of VOI block of dimensions of Sx, Sy, Sz or VOI cylinder of dimensions of Sx=Sy=Sxy are defined. An analyzed particle and VOI position is selected. A VOI is visualized. Observed space is corrected by VOI visualization. The last level is selected by gaze of the operator from the sequence of probe levels and the gaze is focused on the last level on which the particle is still visible. The property of the marked particle in 3D space is verified, and marked with a color mark. The mark position is determined by interpolation or by finding a representative point.

3 Claims, 4 Drawing Sheets

(51) Int. Cl.
*G06F 3/0484* (2013.01)
*G06K 9/00* (2006.01)
*G06T 7/62* (2017.01)
*G06T 7/70* (2017.01)
*G06T 7/60* (2017.01)

(52) U.S. Cl.
CPC ..... *G06F 3/04842* (2013.01); *G06K 9/00127* (2013.01); *G06K 9/00597* (2013.01); *G06T 7/60* (2013.01); *G06T 7/62* (2017.01); *G06T 7/70* (2017.01); *G06T 2207/10056* (2013.01); *G06T 2219/2012* (2013.01)

(58) Field of Classification Search
CPC ....... G06K 9/00597; G06T 19/20; G06T 7/62; G06T 7/70; G06T 7/60; G06T 2207/10056; G06T 2219/2012
See application file for complete search history.

(56) References Cited

U.S. PATENT DOCUMENTS

| | | | |
|---|---|---|---|
| 2011/0110576 A1* | 5/2011 | Kreeger | G16H 50/50 |
| | | | 382/132 |
| 2012/0045111 A1 | 2/2012 | Palma | |
| 2016/0147308 A1* | 5/2016 | Gelman | H04N 9/31 |
| | | | 345/156 |

OTHER PUBLICATIONS

The Anatomical Record, vol. 231, No. 4, M.J. West, L. Slomianka, and H.J. Gundersen, "Unbiased Stereological Estimation of the Total Number of Neurons in the Sub-Divisions of the Rat Hippocampus Using the Optical Fractionator,", pp. 482-497, Dec. 1991.
John Hopkins University Press, Peter R. Mouton, "Unbiased Stereology: A Concise Guide", pp. 71-90, 2013, ISBN: 9780801899850.

* cited by examiner

METHOD OF INTERACTIVE QUANTIFICATION OF DIGITIZED 3D OBJECTS USING AN EYE TRACKING CAMERA

TECHNICAL FIELD

The invention relates to a method of interactive quantification of digitized 3D objects using an eye tracking camera in combination with selective projection of series of sections into plane. The invention belongs to the field of biomedicine when evaluating images from a confocal microscope or from a computer tomograph.

BACKGROUND ART

Several acquisition units (confocal microscope, CT) provide a series of digital images representing sections through bodies from which it is possible to obtain (by means of 3D reconstruction) an idea about their shape and distribution in three-dimensional space. In addition to visualization, we often need to analyze objects, i.e. we need to determine e.g. their number, size, shape parameters, etc. When analyzing, we transform backwards these three-dimensional data onto the two-dimensional screen so that the objects are easily recognizable, e.g. in which section a certain object appears and in which section this object disappears. In the case of low-quality images, semi-automatic methods, based on observation and interaction of the operator, are more reliable than fully automatic methods. A simple example of such interaction can be the counting of particles in 3D by clicking with the mouse on the first and the last section through the particle, while levels between them are marked automatically by interpolation. This procedure is the basis of several methods of 3D objects analysis, e.g. from the field of stereology.

In order to obtain information about the internal structure of an object, various physical principles are used resulting in acquisition of an image of optical section through a body in a certain depth. In the case of microscopy, we can focalize by a suitable objective in a small depth range and determine so the z-position of internal objects. This information can be directly used during observation of the preparation for 3D analysis by optical dissector method (M. J. West, L. Slomianka, and H. J. Gundersen, "Unbiased stereological estimation of the total number of neurons in the sub-divisions of the rat hippocampus using the optical fractionator," Anat Rec, vol. 231, no. 4, pp. 482-97, December, 1991). The principle of the method is based on finding the last existing section through the body. An example of this can be the cantle of man's head, thus the number of people in the room can be determined by counting the cantles of heads. Several devices have been created using this method, such as C.A.S.T. GRID (Olympus Denmark), Stereo-Investigator (MicroBrightField, Inc.), Digital Stereology (Kinetic Imaging, Ltd.), Stereologer (Systems Planning and Analysis, Inc). Several of these devices provide also the possibility to save the scanned images and process them off-line with existing stereological software. However, this approach is only a substitute for on-line analysis and does not use opportunities arising from the existence of 3D data.

In order to obtain quantitative data about the object, stereological methods are used that estimate the properties of objects in 3D based on 2D sections (e.g. the number of neuronal cells in the brain, the percentage of surviving stem cells in the spinal cord, the dominant orientation of particles in an alloy, etc.). The basis of the so-called unbiased methods described in literature (P. R. Mouton. "Unbiased Stereology" John Hopkins University Press, ISBN: 9780801899850, 2013) is the appropriate selection of several small subvolumes (stereological probes) in which a "representative study" of properties is performed (e.g. counting and marking of particles inside the stereological probe performed by a person using a suitable visualization software).

However, interactive analysis is a time-consuming and monotonous activity and an increase of its efficiency is highly desirable. An analysis of state of the art demonstrates that the vast majority of 3D analysis systems of microscopic data is performed using single-purpose on-line systems (e.g. StereoInvestigator) which are relatively costly for smaller workplaces. In addition, they require time-consuming manual refocalization of the sample to determine the last section through the body.

A more efficient and natural interaction between the operator and the machine can be provided by modern technical means which include also a camera tracking the direction of gaze (gaze tracker). Partial solutions of the given topics are known in the prior art describing for example the movement of the cursor on the imaging device only with the aid of a device that tracks the movement of user's eyes, allowing the user to perform certain basic functions, as described e.g. in document US 2010182232 A1. Also known is document WO 2007107949 A1, where a part of the imaging device is a device that tracks user's eyes which is located at the bottom part of the imaging device. By directing user's gaze on exact locations on the imaging device, the user is able to perform certain predefined operations, such as adjustment of brightness/contrast or zoom in/out of the observed image.

SUMMARY OF INVENTION

The aforementioned drawbacks are substantially eliminated by the method of interactive quantification of digitized 3D objects using an eye tracking camera in combination with selective projection of series of sections into plane according to the this invention, i. e. the problem of three-dimensional image data analysis is solved by means of two-dimensional visualization combined with the use of a camera that tracks the operator's gaze. The given solution speeds up the interactive analysis. The nature of the method consists in the following steps:

a) Determination of the observed screen space. The "gaze tracker" type camera attached to the bottom of the monitor senses the position of operator's pupils and determines the coordinates of the observed screen space. These coordinates are one of the inputs of the evaluation algorithm. In the same way it will be possible to use a miniaturized version of the camera built into glasses.

b) Definition of dimensions of the studied VOI (Volume Of Interest) sub-volume. It is assumed that the analyzed particle will all fit into the particular VOI block of dimensions of Sx, Sy, Sz. Further analysis as well as visualization of the particle will take place only inside the particular VOI. Its dimensions can be set beforehand or adaptively determined by image analysis during particle selection. In the case of particles of approximately circular shape, we use the dimensions $Sx=Sy=Sxy$.

c) Selection of the analyzed particle and VOI position. The operator marks the analyzed particle on the reference level (by means of mouse, gaze or by touching the screen, etc.).

This defines the VOI position so that its base lies on the reference level, while from the side and from the top it bounds the particle.

d) VOI visualization. Immediately after particle selection c) starts the visualization, where its individual levels are displayed side by side on the screen so that maximum screen dimension (typically width) is used.

e) Correction of the observed space by VOI visualization. The accuracy of the gaze tracking camera is not sufficient for accurate localization of the particle. However, for the requirements of the invention such accuracy is sufficient that reliably distinguishes neighboring levels, i.e. Sxy. During measurement, the observed level is highlighted by a bold box.

f) Selection of the last level by gaze. The operator checks by gaze the sequence of probe levels and focuses his gaze on the last level on which the particle is still visible. Level identification is confirmed by gaze fixation for a certain period of time, voice command, release of mouse button pressed in phase c), eyewink, etc.

g) Analysis and marking of the particle. The algorithm verifies the properties of the marked particle in 3D space, for example whether the particle on higher levels meets the criteria of stereological probe. Based on the analysis, it marks it with a particular color mark, while the mark position on levels between the marked levels is determined by interpolation or by finding a representative point by analyzing real image data.

h) Registration of the analyzed particle. The location of the marked particle is retained and based on the analysis a color is assigned to it that visually distinguishes it at all levels. This prevents its subsequent duplicate analysis.

i) 3D visualization and error correction. After marking all analyzed particles, the entire analyzed volume, including marks and assigned numeric data, can be displayed by 3D visualization. The possibility of scaling and rotation of the object allows a detailed verification of correctness of mark assignment. This control is important in cases where the routine marking operation was performed remotely via internet by a person provided the resulting visualization to the customer for review (similarly as the "Mechanical Turk" service by Amazon). When an incorrectly marked or analyzed particle is discovered, manual correction can be performed.

Advantages of the method of interactive quantification of digitized 3D objects using an eye tracking camera in combination with selective projection of series of sections into plane according to the invention are evident from the measurable effects. A person naturally uses sight to locate an object of interest and also to analyze it by gaze. In interactive methods of 3D analysis, the person also has to do some action to confirm his categorization (by keyboard, mouse). Our proposed solution minimizes the need for this step because the person performs the categorization by gaze which is a significant simplification of a monotonous and time-consuming activity. In this method, original is the use of the camera that tracks the operator's eyes and based on this identifies the coordinates of the observed screen space. Thus, the operator performs some operations much faster—only by gaze instead of by clicking with the mouse. An indispensable part of the solution is a suitable visualization method that minimizes the drawbacks of the eye tracker by adjusting dimensions of sections of the analyzed particle to the dimensions of the screen after the first marking and by reducing the visibility of other particles so that they do not distract the gaze of the operator. Depending on the type of measurement, the localization by short-term gaze fixation may be combined with other forms of interaction (button, voice command, eyewink, etc.). Using a subsequent 3D visualization of marked particles it is possible to check backwards the correctness of the procedure. An advantage of the method according to the invention with the use of an eye tracking camera is that the interactive evaluation of existence of visualized image data only by gaze is significantly faster than other forms of analysis. The price of this type of camera itself is currently around 600 EUR and represents only a small fraction of the price of mentioned single-purpose devices.

It can be assumed that the importance of 3D objects analysis by gaze with the use of suitable visualization will grow in the near future with the development of glasses for virtual reality. The method according to the invention would extend to the field of microscopic and tomographic data analysis.

DESCRIPTION OF EMBODIMENTS

We assume that individual embodiments according to the invention are presented for illustration and not as limitations of technical solutions. Persons skilled in the field will find or will be able to ascertain, by using no more than a routine experimentation, many equivalents to the specific embodiments of the technical solution. Even such equivalents will fall within the scope of the following patent claims. For persons skilled in the field, optimal construction design and selection of its elements is not a problem; therefore these features have not been solved in detail.

Example

Figure 1:
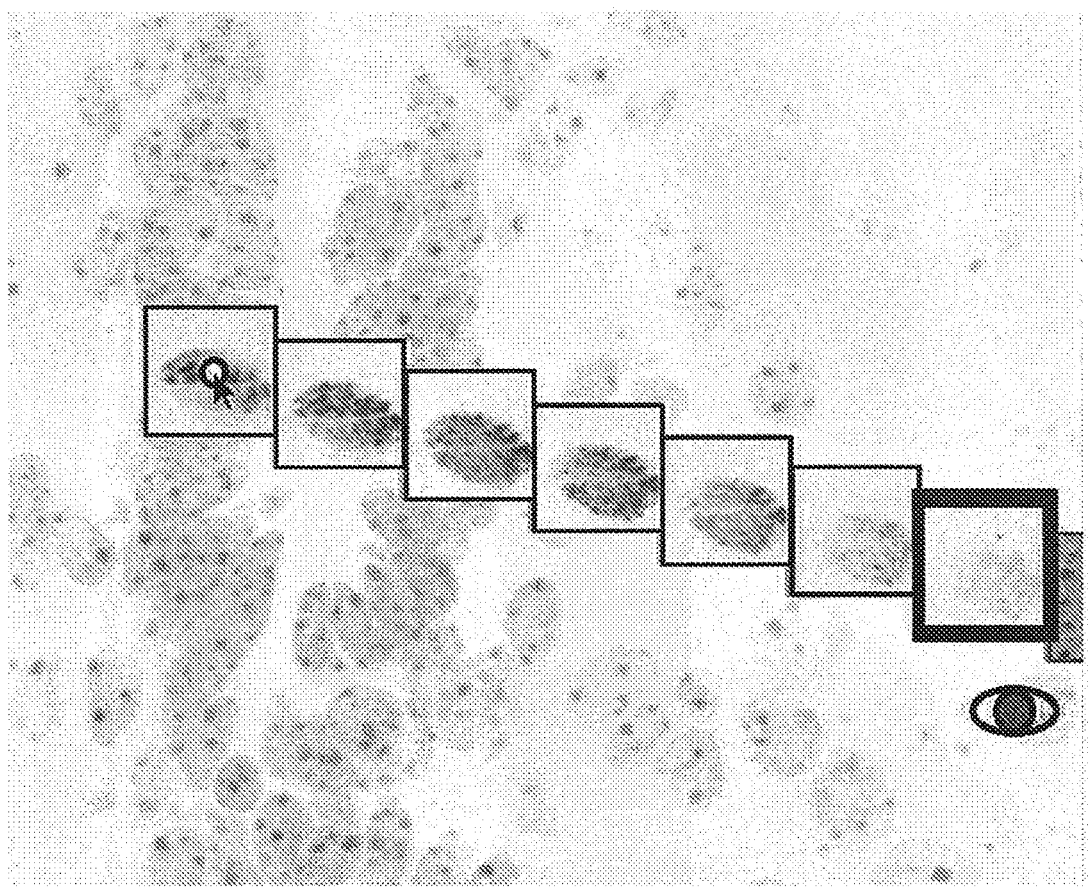
FIG. 1 depicts combined interaction mouse/gaze. Using the mouse (arrow) an object is selected on the reference level, the algorithm displays all relevant levels side by side, the operator locates by gaze (the eye symbol) the last level of particle occurrence which is after correction represented by a bold square.
Figure 2:
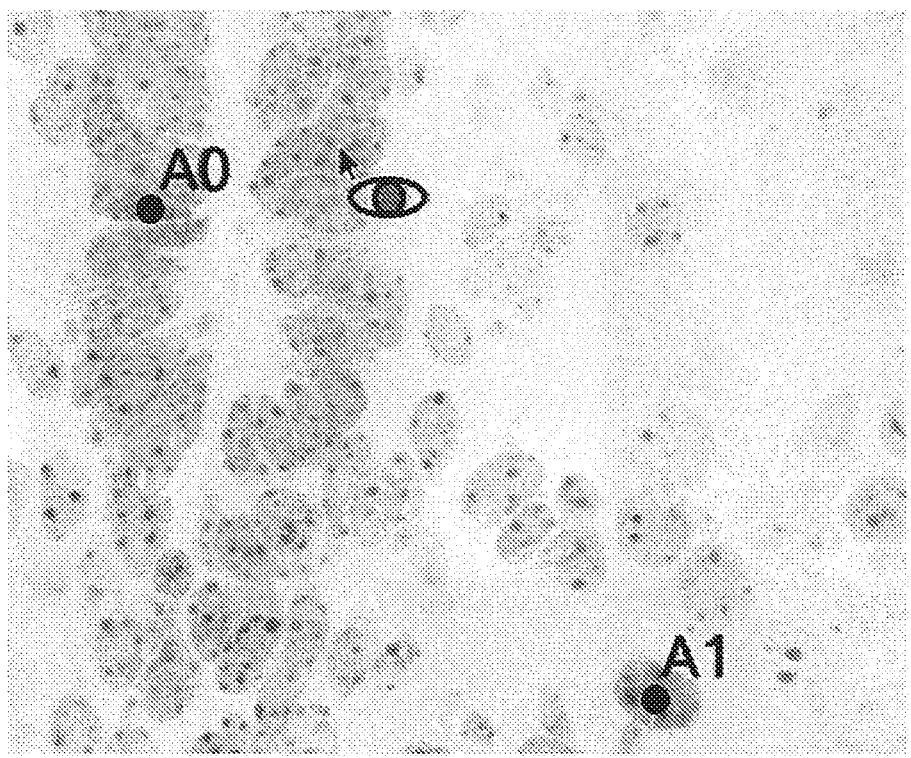
FIG. 2 shows the marking process, where particles designated as A0 and A1 have already been analyzed and categorized. Using the cursor (drawn as eye or arrow) another particle is selected for analysis.
Figure 3:
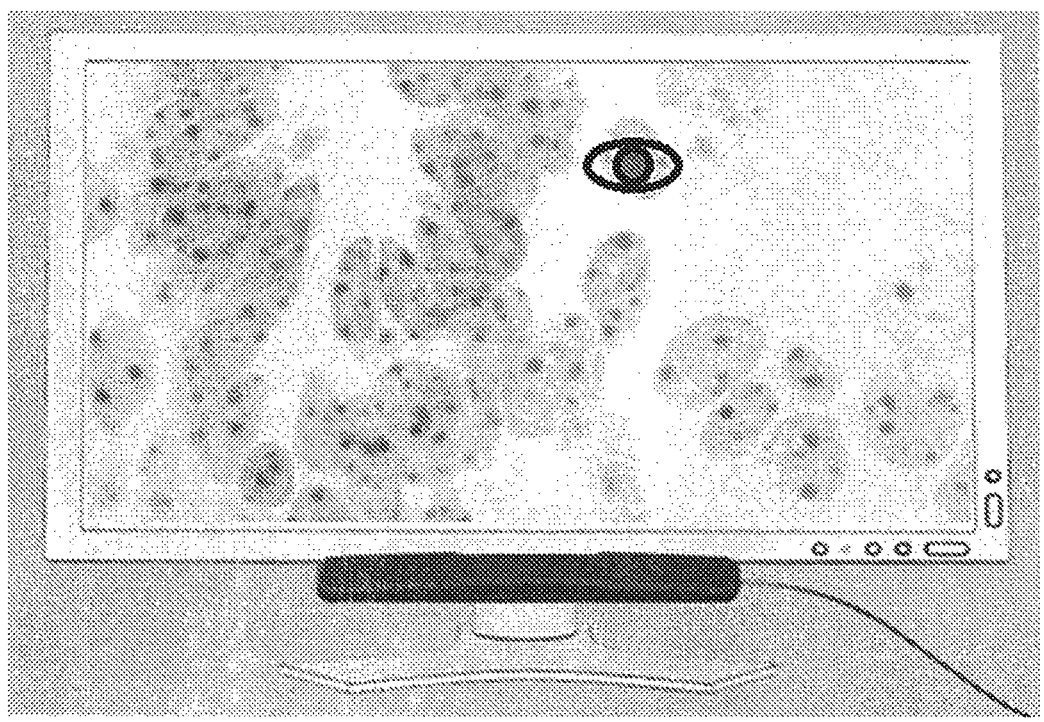
FIG. 3 depicts the mounting of the camera tracking the gaze direction to the bottom part of the monitor and finding of coordinates of the observed screen space and its highlighting.
Figure 4:
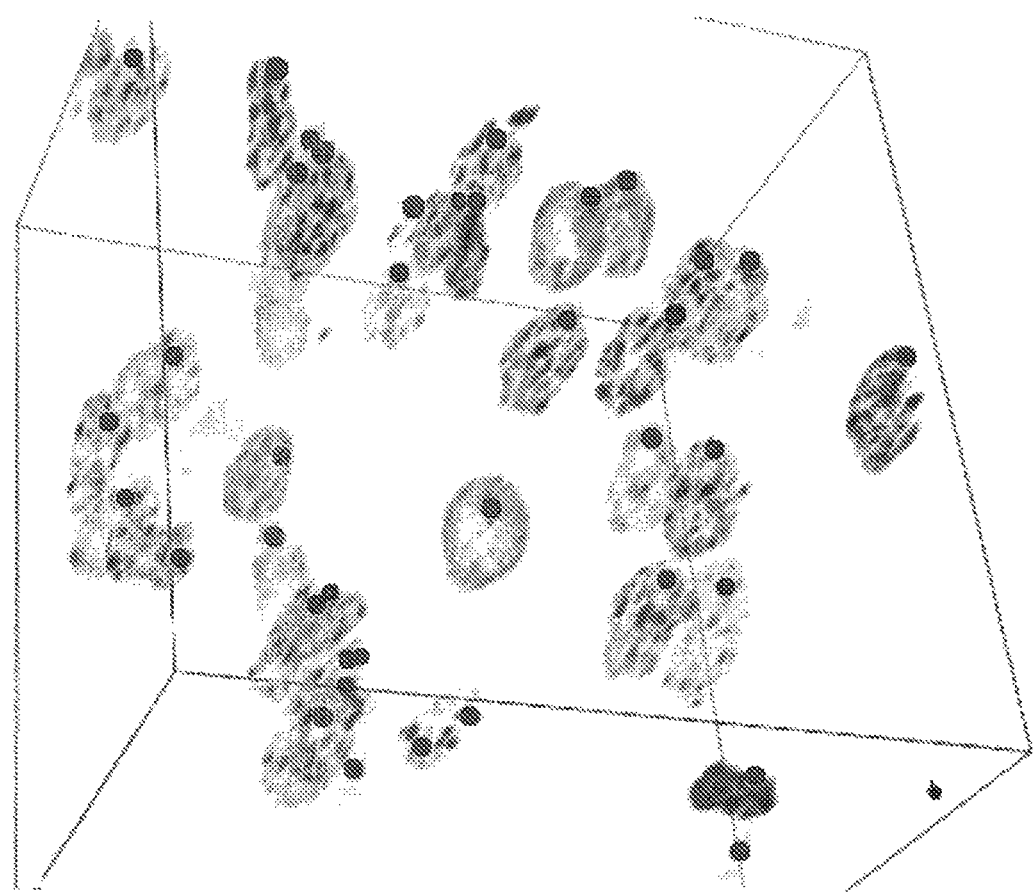
FIG. 4 shows the result of analysis in the form of three-dimensional visualization of the monitored VOI volume with the possibility of rotation and scaling allowing visual control of its correctness.

In this example of a particular embodiment of subject of the invention, the method of interactive quantification of digitized 3D objects using an eye tracking camera is described with the following succession of steps, where:

a) coordinates of observed screen space are determined using a camera that senses the position of pupils of the operator gazing on the screen, as depicted in FIG. 3;

b) dimensions of studied sub-volume of VOI block of dimensions of Sx, Sy, Sz or VOI cylinder of dimensions of Sx=Sy=Sxy are defined;

c) analyzed particle and VOI position is selected;

d) VOI is visualized, where its individual levels are displayed side by side on the screen;

e) observed space is corrected by VOI visualization, where the observed level is highlighted by a bold box;

f) the last level is selected by gaze of the operator from the sequence of probe levels and the gaze is focused on the last level on which the particle is still visible, and level identification is confirmed by gaze fixation for a certain period of time, as depicted in FIG. 1;

g) the particle is analyzed by algorithm to verify the property of the marked particle in 3D space, and the particle is marked with a color mark, while the mark position on levels between the marked levels is determined by interpolation or by finding a representative point by analyzing real image data;

h) the analyzed particle is registered by retaining the location of the marked particle and the assigned color for visual differentiation at all levels;

i) 3D visualization of the entire analyzed volume, including marks and assigned numeric data, and error correction, is performed after marking all analyzed particles, as depicted in FIG. 4.

INDUSTRIAL APPLICABILITY

Industrial applicability of the given method of interactive quantification of digitized 3D objects using an eye tracking camera according to the invention represents a usable technology in general in 3D analysis of microscopic images, and in particular in biomedicine, when evaluating images from a confocal microscope or from a computer tomograph.

The invention claimed is:

1. The method of interactive quantification of digitized 3D objects using an eye tracking camera, characterized in that, in the following steps:
   a) coordinates of observed screen space are determined using a camera that senses a position of pupils of an operator gazing on a screen surface;
   b) dimensions of a volume of interest ("VOI") are defined, wherein the VOI is a block or a cylinder;
   c) a particle and a position of the VOI is selected by the operator on a reference level by means of pressing of a mouse button or by gaze or by touching the screen surface, where the VOI base lies on the reference level, while from a side and from a top it bounds the particle;
   d) the VOI is visualized, wherein two-dimensional images of the VOI are simultaneously displayed side by side on the screen surface;
   e) observed screen space is corrected by VOI visualization, where an observed one of the two-dimensional images of the individual levels of the VOI is visually distinguished from other of the two-dimensional images of the individual levels of the VOI;
   f) a last of the two-dimensional images of the individual levels is selected by gaze of the operator, and the gaze is focused on the last of the two-dimensional images of the individual levels of the VOI on which the particle is still visible, and identification of the last of the two-dimensional images of the individual levels is confirmed by gaze fixation for a certain period of time or by voice command or by release of the mouse button pressed in phase c) or by eyewink; and
   g) the particle is analyzed by an algorithm to verify a property of the particle in 3D space, and the particle is marked in the two-dimensional images with a color mark, while a mark position on levels between marked ones of the two-dimensional images of the VOI is determined by interpolation or by finding a representative point by analyzing the two-dimensional images.

2. The method of interactive quantification of digitized 3D objects using an eye tracking camera according to claim 1, characterized in that, after analyzing the particle by the algorithm to verify the property of the marked particle in 3D space, and after marking the particle with the color mark of an assigned color, the analyzed particle is registered by retaining a location of the marked particle and the assigned color for visual differentiation at all levels.

3. The method of interactive quantification of digitized 3D objects using an eye tracking camera according to claim 2, characterized in that, after marking one or more analyzed particles, 3D visualization of at least a portion of the VOI in which the one or more analyzed particles is positioned, including marks and assigned numeric data, and error correction, is performed.

* * * * *